(12) United States Patent
Kang et al.

(10) Patent No.: US 11,508,397 B2
(45) Date of Patent: Nov. 22, 2022

(54) METHOD AND SYSTEM FOR GENERATING MIXED VOICE DATA

(71) Applicant: YEALINK (XIAMEN) NETWORK TECHNOLOGY CO., LTD., Xiamen (CN)

(72) Inventors: Yuanxun Kang, Xiamen (CN); Zehuang Fang, Xiamen (CN); Wanjian Feng, Xiamen (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 333 days.

(21) Appl. No.: 16/871,816

(22) Filed: May 11, 2020

(65) Prior Publication Data

US 2020/0365174 A1 Nov. 19, 2020

(30) Foreign Application Priority Data

May 13, 2019 (CN) .......................... 201910394160.1

(51) Int. Cl.
*G10L 25/93* (2013.01)
*G10L 21/0208* (2013.01)

(52) U.S. Cl.
CPC .......... *G10L 25/93* (2013.01); *G10L 21/0208* (2013.01); *G10L 2025/935* (2013.01)

(58) Field of Classification Search
CPC  G10L 25/93; G10L 21/0208; G10L 2025/935
See application file for complete search history.

(56) References Cited

U.S. PATENT DOCUMENTS

| | | | | |
|---|---|---|---|---|
| 2012/0250882 | A1* | 10/2012 | Mohammad | H04M 9/082 381/94.1 |
| 2013/0282373 | A1* | 10/2013 | Visser | G10L 21/0208 704/231 |
| 2015/0228288 | A1* | 8/2015 | Subasingha | G10L 21/038 704/500 |
| 2017/0186442 | A1* | 6/2017 | Cahill | G10L 21/0216 |
| 2017/0213553 | A1* | 7/2017 | Gunn | G06F 1/3234 |
| 2018/0007267 | A1* | 1/2018 | Ohtsuka | G03B 17/02 |
| 2018/0063644 | A1* | 3/2018 | Bach | H04R 19/005 |
| 2019/0043516 | A1* | 2/2019 | Germain | G10L 21/0208 |
| 2019/0304460 | A1* | 10/2019 | Gunn | G06F 1/3206 |
| 2019/0371353 | A1* | 12/2019 | Lambert | H04R 17/02 |
| 2020/0066296 | A1* | 2/2020 | Sargsyan | G10L 21/0232 |

* cited by examiner

*Primary Examiner* — Anne L Thomas-Homescu

(57) ABSTRACT

The present disclosure discloses a method and system for generating mixed voice data, and belongs to the technical field of voice recognition. In the method for generating mixed voice data according to the present disclosure, a pure voice and noise are collected first, normalization processing is performed on the collected voice data, randomization processing is performed on processed data, then GAIN processing is performed on the data, and finally filter processing is performed to obtain mixed voice data. The system for generating mixed voice data according to the present disclosure includes a collecting unit, a calculating unit, and a storage unit, the collecting unit being electrically connected to the calculating unit, and the calculating unit being connected to the storage unit through a data transmitting unit. The present disclosure provides the method and the system to meet the data requirement of deep learning.

12 Claims, 3 Drawing Sheets

METHOD AND SYSTEM FOR GENERATING MIXED VOICE DATA

BACKGROUND

Related Application

This application claims priority to Chinese Application Number 201910394160.1, filed on May 13, 2019, which is herein incorporated by reference.

Technical Field

The present disclosure relates to the field of voice recognition technology, and more specifically, to a method and a system for generating mixed voice data.

RELATED ART

With the development of science and technology, voice recognition is critical in artificial intelligence applications. The simple and convenient use of a voice control device has led to a wave of research and application in various fields. Data, an algorithm, and a chip are three keys of a voice recognition technology, and a large amount of high-quality data, an accurate and fast algorithm and a high-performance voice recognition chip are the core of improving voice recognition. The voice recognition technology is a high technology that allows a machine to convert a voice signals into a corresponding text or command through recognition and understanding processes, and the voice recognition technology mainly includes three aspects: a feature extraction technology, a pattern matching criterion, and a model training technology. Voice recognition is the key technology to realize human-computer free interaction and promote the development of artificial intelligence.

Deep learning is a method of machine learning based on representational learning of data. An observation value may be expressed in a plurality of manners, such as a vector of an intensity value for each pixel, or is more abstractly expressed as a series of edges, a region of a specific shape, and the like. It is easier to learn tasks from examples by using some specific representation methods. As a machine learning theory that simulates human brain's perception and learns external information, a deep learning model has great research value and practical value by combining deep learning with the voice recognition technology.

Currently, application of deep learning in the field of voice recognition is constantly developing, but the shortage of audio data required for deep learning is a big problem in the prior art. In a traditional solution, data is usually collected through manual collection, but in an actual process, manually collected noise is difficult to cover every scene. Consequently, a long manual collection period is not conducive to research and development, and also increases costs of research and development In view of the above, how to obtain mixed voice data to meet a data requirement of deep learning is a problem that needs to be urgently resolved in the prior art.

SUMMARY

1. To-be-Resolved Problem

In order to overcome the shortage of audio data required for deep learning in the prior art, the present disclosure provides a method and a system for generating mixed voice data, so that mixed voice data can be generated in batches to meet the data requirement of deep learning.

2. Technical Solution

In order to resolve the foregoing problem, the technical solutions adopted by the present disclosure are as follows:

In the method for generating mixed voice data according to the present disclosure, a pure voice and noise are collected first, normalization processing is performed on the collected voice data, randomization processing is performed on processed data, then GAIN processing is performed on the data, and finally filter processing is performed to obtain mixed voice data.

Still further, specific steps are as follows: Step 1. Collection of original data: Pure voice data and noise data are collected first. Step 2. Normalization processing: The collected voice data is converted into single-channel data first, the data is resampled, and then data is multiplied by a normalization coefficient to obtain normalized data. Step 3. Randomization processing: A file sequence of the data is randomized. Step 4. GAIN processing: Different GAIN values are respectively defined for the pure voice data and the noise data, where a range of the GAIN value is $0<g<1$. Step 5. Filter processing: Low-pass filtering processing, high-pass filtering processing, and parameter filtering processing are sequentially performed on the data by using a filter to obtain the mixed voice data.

Still further, a formula for converting dual-channel data of the voice data into single-channel data in step 2 is:

$$\text{Mono}(x) = \text{mean}(D_0(x) + D_1(x))$$

$\text{Mono}(x)$ represents the single-channel data, $D_0$ and $D_1$ respectively represent audio data of two channels, and mean represents an average value of $D_0$ and $D_1$.

Still further, a specified frequency for resampling in step 2 is 8 KHz or 16 KHz or 44.1 KHz, and a value of the normalization coefficient is 0.767.

Still further, a frequency point of low-pass filtering in step 5 is 0.95f, and a frequency point of high-pass filtering is 0.005f, f being a highest frequency of a voice signal.

Still further, a process of parameter filtering processing is: first setting a numerator coefficient vector and a denominator coefficient vector n of the filter, and then performing filtering processing on the data, a range of the numerator coefficient vector being $-1<m<1$, and a range of the denominator coefficient vector being $-1<n<1$.

Still further, the filter is an infinite impulse response (IIR) digital filter.

The system for generating mixed voice data according to the present disclosure includes a collecting unit, a calculating unit, and a storage unit, the collecting unit being electrically connected to the calculating unit, and the calculating unit being connected to the storage unit through a data transmitting unit, where the calculating unit includes a memory and a processor, the memory storing a program for implementing the method for generating mixed voice data, and the processor being configured to execute the program to generate mixed voice data.

Still further, the collecting unit includes a sound collector and a signal converter, the sound collector being electrically connected to the signal converter, and the signal converter being electrically connected to the calculating unit.

3. Beneficial Effect

Compared with the prior art, the beneficial effects of the present disclosure are as follows:

In the method for generating mixed voice data according to the present disclosure, a pure voice and noise are processed, so that mixed voice data can be automatically generated in batches. In this way, a data collection speed is increased to meet a data requirement of deep learning, and a deep learning model is fully trained, so that a convergence speed of the model is increased and an error rate in an instantiation test is further reduced. In the system for generating mixed voice data according to the present disclosure, mixed voice data can be generated in batches, and the system can be applied to the audio field of deep learning to meet a data requirement of a deep learning model, thereby improving performance of the deep learning model.

Figure 1:
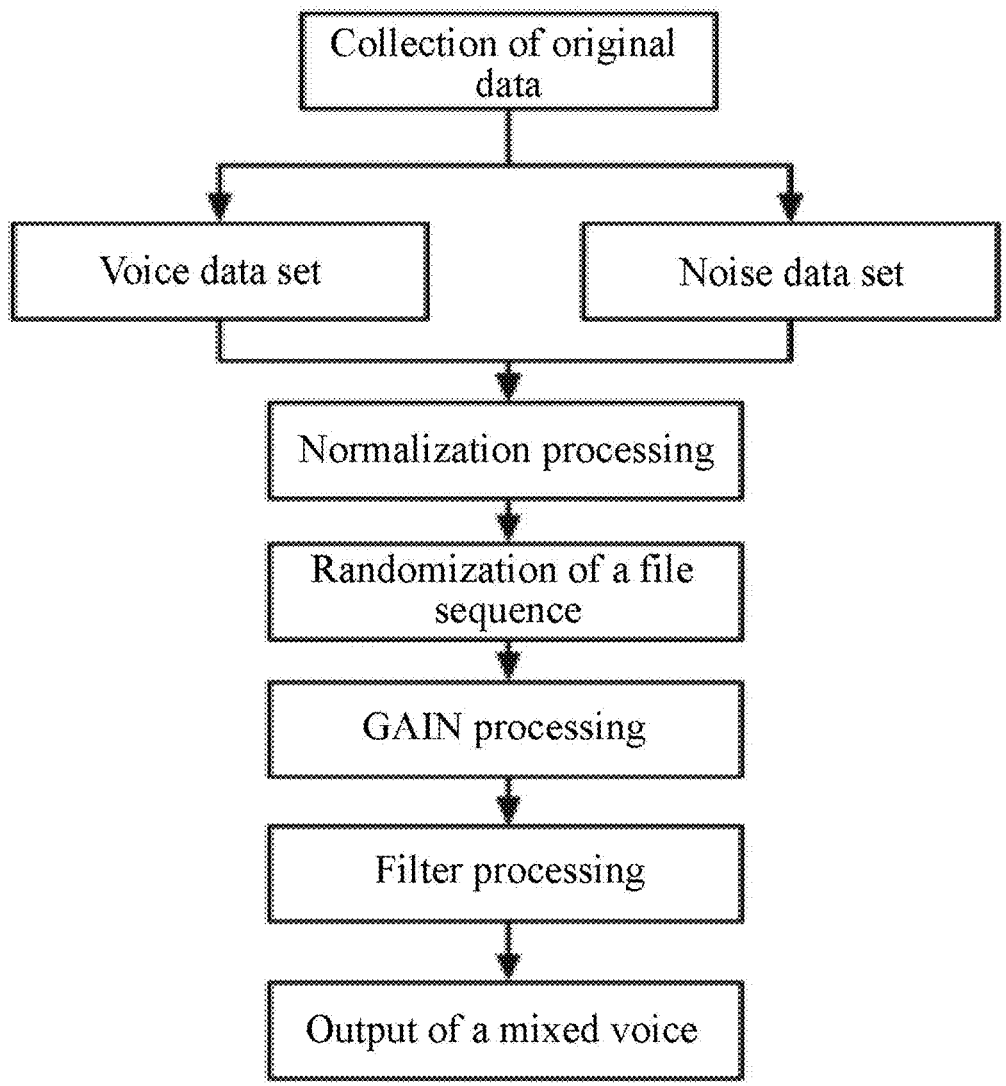
FIG. 1 is a schematic flowchart of a method for generating mixed voice data according to the present disclosure.

Reference numerals: 100. Collecting unit; 200. Calculating unit; 300. Data transmitting unit; 400. Storage unit.

DETAILED DESCRIPTION

In order to make the objectives, technical solutions, and advantages of the present disclosure more comprehensible, the technical solutions according to embodiments of the present disclosure are clearly and completely described in the following with reference to the accompanying drawings. Apparently, the embodiments in the following description are merely some rather than all of the embodiments of the present disclosure. Moreover, the various embodiments are not relatively independent, and may be combined with each other as needed to achieve a better effect. Therefore, the following detailed description of the embodiments of the present disclosure provided in the accompanying drawings is not intended to limit the protection scope of the present disclosure, but merely represents selected embodiments of the present disclosure. All other embodiments obtained by a person of ordinary skill in the art based on the embodiments of the present disclosure without creative efforts shall fall within the protection scope of the present disclosure.

For further understanding of the present disclosure, the present disclosure is described in detail with reference to the accompanying drawings and embodiments.

Embodiment 1

As shown in FIG. 1, in a method for generating mixed voice data according to the present disclosure, a pure voice and noise are collected first, normalization processing is performed on the collected voice data, randomization processing is performed on processed data, then GAIN processing is performed on the data, and finally filter processing is performed to obtain mixed voice data. Specific steps are as follows:

Step 1. Collection of Original Data

Figure 2:
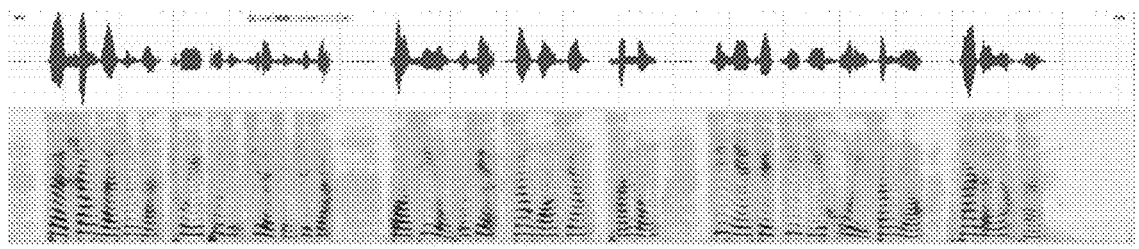
FIG. 2 is a schematic diagram of pure voice data in Embodiment 1.
Figure 3:
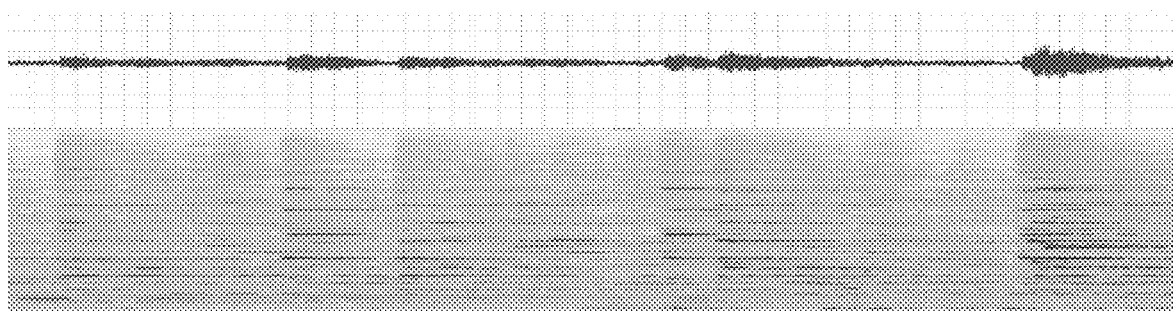
FIG. 3 is a schematic diagram of noise data in Embodiment 1.

Pure voice data and noise data are collected first. In this embodiment, a pure voice is collected in an anechoic room, and the pure voice is a voice with low background noise and a high signal-to-noise ratio (as shown in FIG. 2). Noise is collected in two manners: field collection and network download collection. It should be noted that noise in different scenarios need to be collected, for example, an office, a street, and a station (as shown in FIG. 3).

Step 2. Normalization Processing

The collected voice data is converted into single-channel data first, the data is resampled, and then data is multiplied by a normalization coefficient to obtain normalized data. Specifically, dual-channel data of the voice data is converted into single-channel data by using the following formula:

$$Mono(x)=mean(D_0(x)+D_1(x))$$

Mono(x) represents the single-channel data, x represents input voice data, $D_0$ and $D_1$ respectively represent audio data of two channels, and mean represents an average value of $D_0$ and $D_1$.

In a data resampling process, downsampling is performed on data whose original data sampling frequency is higher than a specified frequency, and upsampling is performed on data whose original data sampling frequency is lower than the specified frequency. In the present disclosure, the specified frequency for resampling is 8 KHz or 16 KHz or 44.1 KHz, and effects of the three specified frequencies are the same, which can avoid a data conflict and abnormal voice synthesis. It should be further noted that a data format in the present disclosure needs to be standardized. The data format in the present disclosure is int16, float32, or float64, and the data format in this embodiment is float32.

Further, the data is multiplied by the normalization coefficient to obtain the normalized data. In the present disclosure, a value of the normalization coefficient is 0.767.

Step 3. Randomization Processing

A file sequence of the normalized data is randomized. In particular, when the noise data is being collected, the collected data is data in different scenarios, and data in each scenario is stored as a file. Therefore, an order of files is randomly disrupted, so that a mixed scenario under different scenario combinations can be generated, and more different mixed scenarios can be generated.

Step 4. GAIN Processing

GAIN processing is performed on the data, and GAIN is a scalar coefficient. In particular, different GAIN values are respectively defined for the pure voice data and the noise data, where a range of the GAIN value is 0<g<1. A real number is selected as a respective gain value within the range of the GAIN value for each of the pure voice data and the noise data. After each mixed voice file is generated, a gain value is selected again, so that various signal-to-noise ratios that may appear in actual application scenarios can be simulated, thereby increasing generalization of the data.

Step 5. Filter Processing

Figure 4:
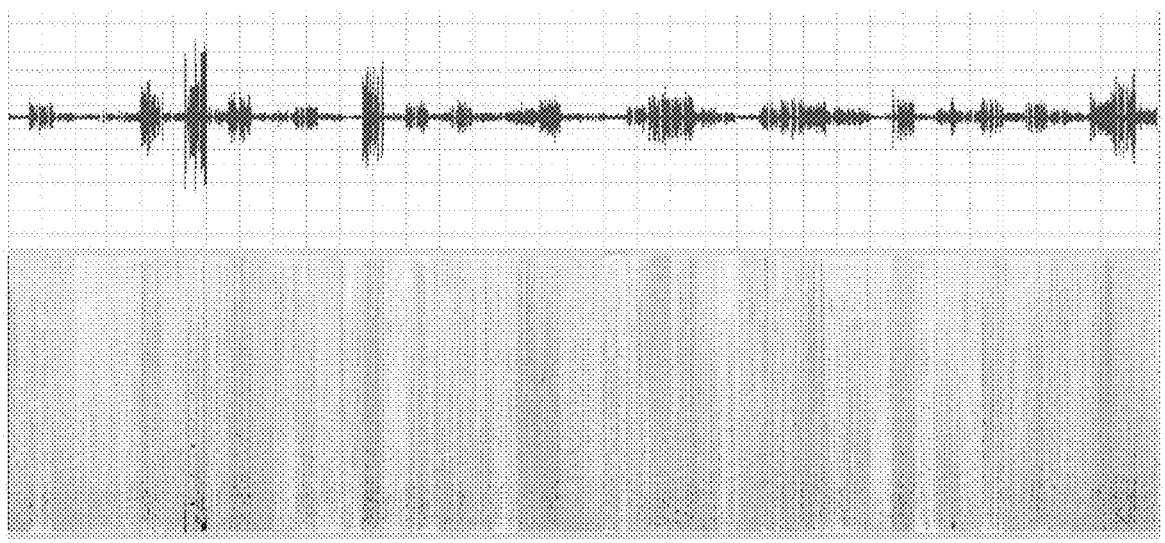
FIG. 4 is a schematic diagram of mixed voice data generated in Embodiment 1.

Low-pass filtering processing, high-pass filtering processing, and parameter filtering processing are sequentially performed on the data by using a filter. In particular, a frequency point of low-pass filtering is 0.95f, and a frequency point of high-pass filtering is 0.005f, f being a highest frequency of a voice signal, and the highest frequency being 8 KHz to 44.1 KHz. A process of parameter filtering processing is: a numerator coefficient vector m and a denominator coefficient vector n of the filter are first set, and then filtering processing is performed on the data, a range of the numerator coefficient vector being −1<m<1, and a range of the denominator coefficient vector being −1<n<1. In this embodiment, the numerator coefficient vector is 0.4, and the denominator coefficient vector is 0.6. The filtered data is mixed voice data (as shown in FIG. 4). In this embodiment, the filter is an IIR digital filter.

Because a model trained with a limited data set is often not generalized enough, the model is difficult to converge, and an error rate of an instantiation test in voice noise reduction is relatively high. In the method for generating mixed voice data according to the present disclosure, a large amount of mixed voice data can be randomly generated through the foregoing steps, and the generated data not only has a high degree of restoration but also a wide scenario coverage. In this way, a data collection speed is increased to meet a data requirement of deep learning, and a deep learning model is fully trained, so that a convergence speed of the model is increased and an error rate in an instantiation test is further reduced.

Figure 5:
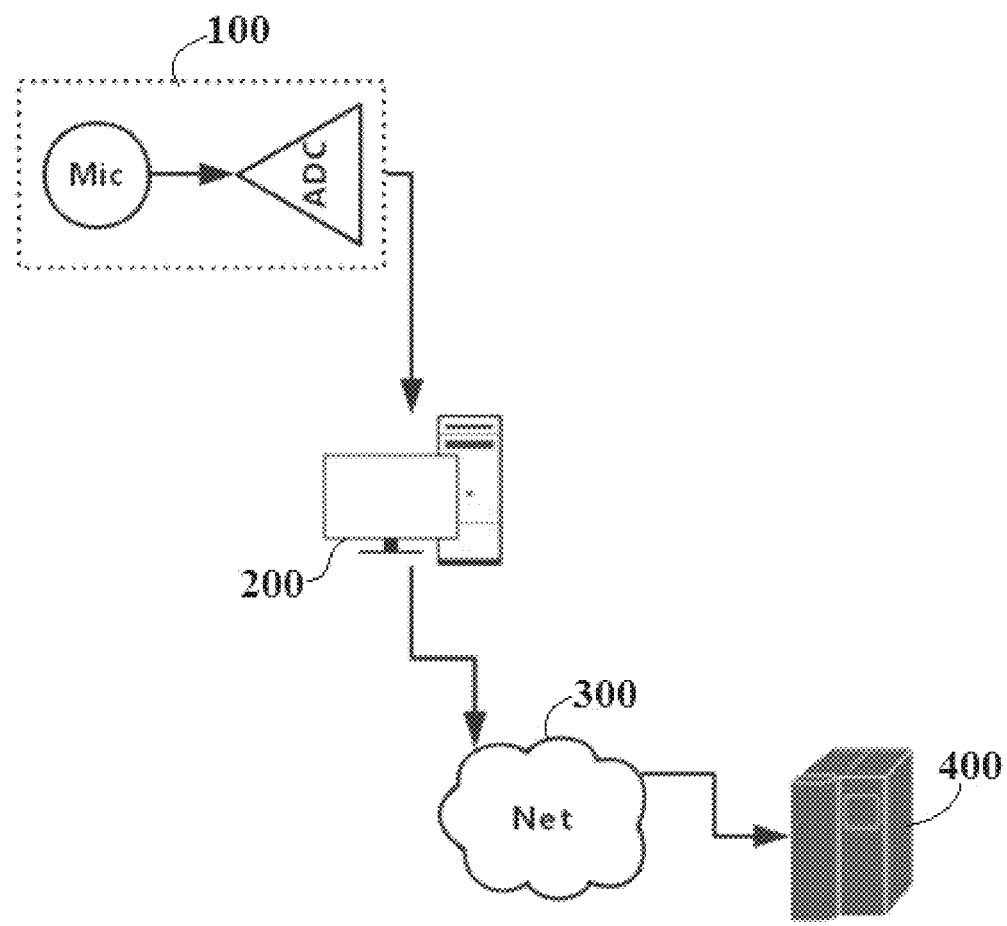
FIG. 5 is a schematic structural diagram of a system for generating mixed voice data according to the present disclosure.

As shown in FIG. 5, a system for generating mixed voice data according to the present disclosure includes a collecting unit 100, a calculating unit 200, and a storage unit 400, the collecting unit 100 being electrically connected to the calculating unit 200, and the calculating unit 200 being connected to the storage unit 400 through a data transmitting unit 300. In particular, the collecting unit 100 includes a sound collector and a signal converter, the sound collector being electrically connected to the signal converter, and the signal converter being electrically connected to the calculating unit 200. The sound collector is configured to collect a voice, and the signal converter is configured to convert an acoustic signal in an environment into a digital signal. In this embodiment, the sound collector is a microphone, and the signal converter is an analog to digital converter (ADC) hardware chip. The calculating unit 200 includes a memory and a processor, a program for implementing the method for generating mixed voice data is stored in the memory, and the processor is configured to execute the program to generate mixed voice data. In this embodiment, the calculating unit 200 is a computer. The data transmitting unit 300 is configured to transmit data. In this embodiment, the data transmitting unit 300 is a network system for transmitting data. The storage unit 400 is configured to store the mixed voice data. The storage unit 400 in this embodiment is connected to the calculating unit 200 through the data transmitting unit 300 by using a network and can quickly transmit and store the generated mixed voice data. In the system for generating mixed voice data according to the present disclosure, mixed voice data can be generated in batches, and the system can be applied to the audio field of deep learning to meet a data requirement of a deep learning model, thereby improving performance of the deep learning model.

The present disclosure is described in detail above with reference to specific exemplary embodiments. However, it should be understood that various modifications and variations may be made without departing from the scope of the present disclosure as defined by the appended claims. The detailed descriptions and the accompanying drawings should only be considered as illustrative instead of limitative. Such modifications and variations shall fall within the scope of the present disclosure described herein. In addition, the background art is intended to explain the current status and significance of the research and development of this technology, and is not intended to limit the present disclosure or this application and the application field of the present disclosure.

What is claimed is:

1. A method for generating mixed voice data, comprising:
collecting pure voice data and noise data that are separate files independent from each other,
performing normalization processing on the collected data to obtain normalized data,
performing randomization processing on the normalized data;
performing GAIN processing on randomized data;
performing filter processing to obtain the mixed voice data,
wherein performing the normalization processing comprises
converting the collected data into single-channel data first, resampling the single-channel data, and then multiplying resampled single-channel data by a normalization coefficient to obtain the normalized data,
wherein performing the randomization processing comprises
randomizing a file sequence of the normalized data,
wherein performing the GAIN processing comprises
respectively defining different GAIN values for the pure voice data and the noise data, wherein a range of the GAIN value is $0<g<1$, and
wherein performing the filter processing comprises
sequentially performing low-pass filtering processing, high-pass filtering processing, and parameter filtering processing on GAIN processed data by using a filter to obtain the mixed voice data.

2. The method for generating mixed voice data according to claim 1, wherein a formula for converting dual-channel data of the voice data into the single-channel data is:
Mono(x)=mean($D_0$(x)+$D_1$(x)), wherein
Mono(x) represents the single-channel data, $D_0$ and $D_1$ respectively represent audio data of two channels, and mean represents an average value of $D_0$ and $D_1$.

3. The method for generating mixed voice data according to claim 1, wherein a specified frequency for the resampling is 8 KHz or 16 KHz or 44.1 KHz, and a value of the normalization coefficient is 0.767.

4. The method for generating mixed voice data according to claim 1, wherein a frequency point of low-pass filtering is 0.95f, and a frequency point of high-pass filtering is 0.005f, f being a highest frequency of a voice signal.

5. The method for generating mixed voice data according to claim 1, wherein a process of the parameter filtering processing is: first setting a numerator coefficient vector m and a denominator coefficient vector n of the filter, and then performing the filtering processing on the GAIN processed data, a range of the numerator coefficient vector being $-1<m<1$, and a range of the denominator coefficient vector being $-1<n<1$.

6. The method for generating mixed voice data according to claim 1, wherein the filter is an infinite impulse response (IIR) digital filter.

7. A system for generating mixed voice data, comprising a collecting unit, a calculating unit, and a storage unit, the collecting unit being electrically connected to the calculating unit, and the calculating unit being connected to the storage unit through a data transmitting unit, wherein the calculating unit comprises a memory and a processor, the memory storing a program for implementing the method for generating mixed voice data according to claim 1, and the processor being configured to execute the program to generate the mixed voice data.

8. The system for generating mixed voice data according to claim 7, wherein the collecting unit comprises a sound collector and a signal converter, the sound collector being electrically connected to the signal converter, and the signal converter being electrically connected to the calculating unit.

9. The method for generating mixed voice data according to claim 2, wherein the filter is an infinite impulse response (IIR) digital filter.

10. The method for generating mixed voice data according to claim 3, wherein the filter is an infinite impulse response (IIR) digital filter.

11. The method for generating mixed voice data according to claim 4, wherein the filter is an infinite impulse response (IIR) digital filter.

12. The method for generating mixed voice data according to claim 5, wherein the filter is an infinite impulse response (IIR) digital filter.

* * * * *